Figure 9:
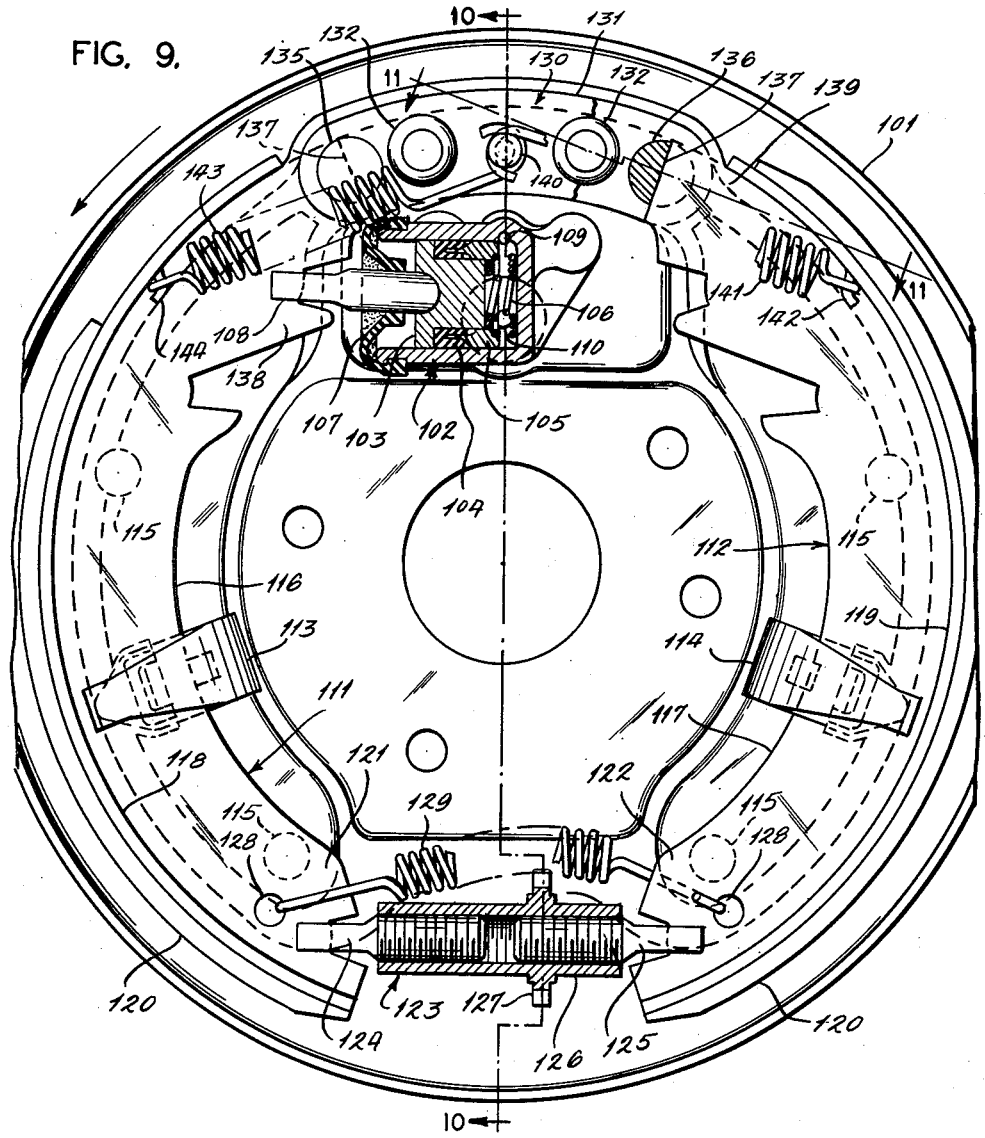

Dec. 21, 1954   S. SCHNELL   2,697,495
COMPOUND BRAKE MECHANISM FOR AUTOMOTIVE VEHICLES
Filed Sept. 29, 1950   6 Sheets-Sheet 1
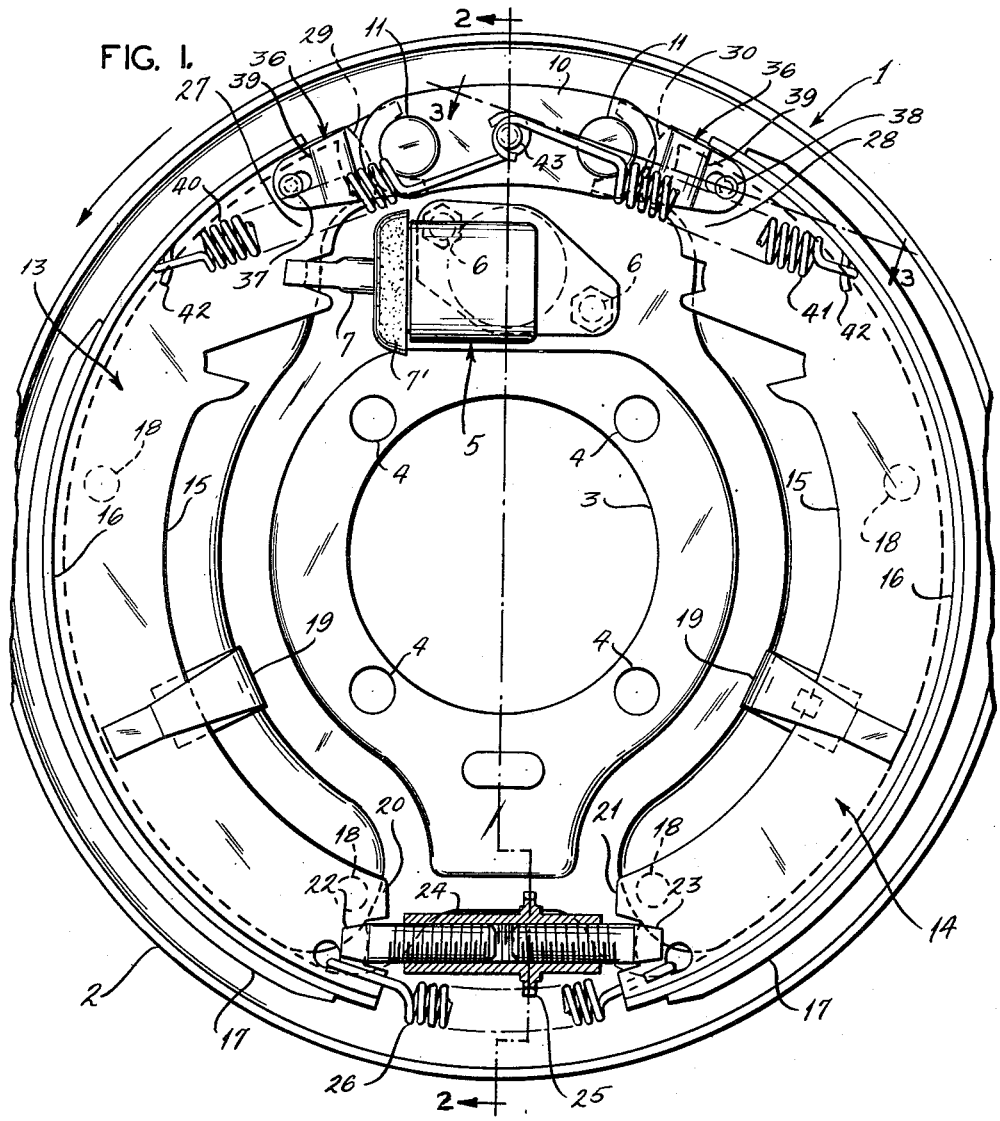
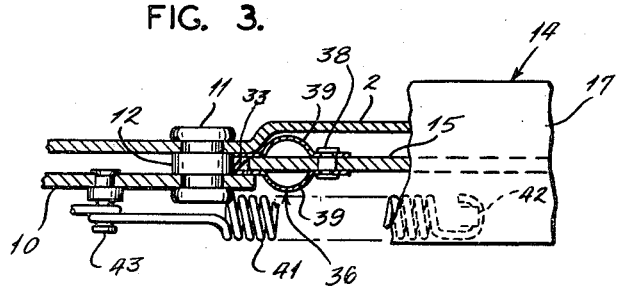
*INVENTOR.*
STEVE SCHNELL
BY
*Carr & Carr & Gravely,*
ATTORNEYS.

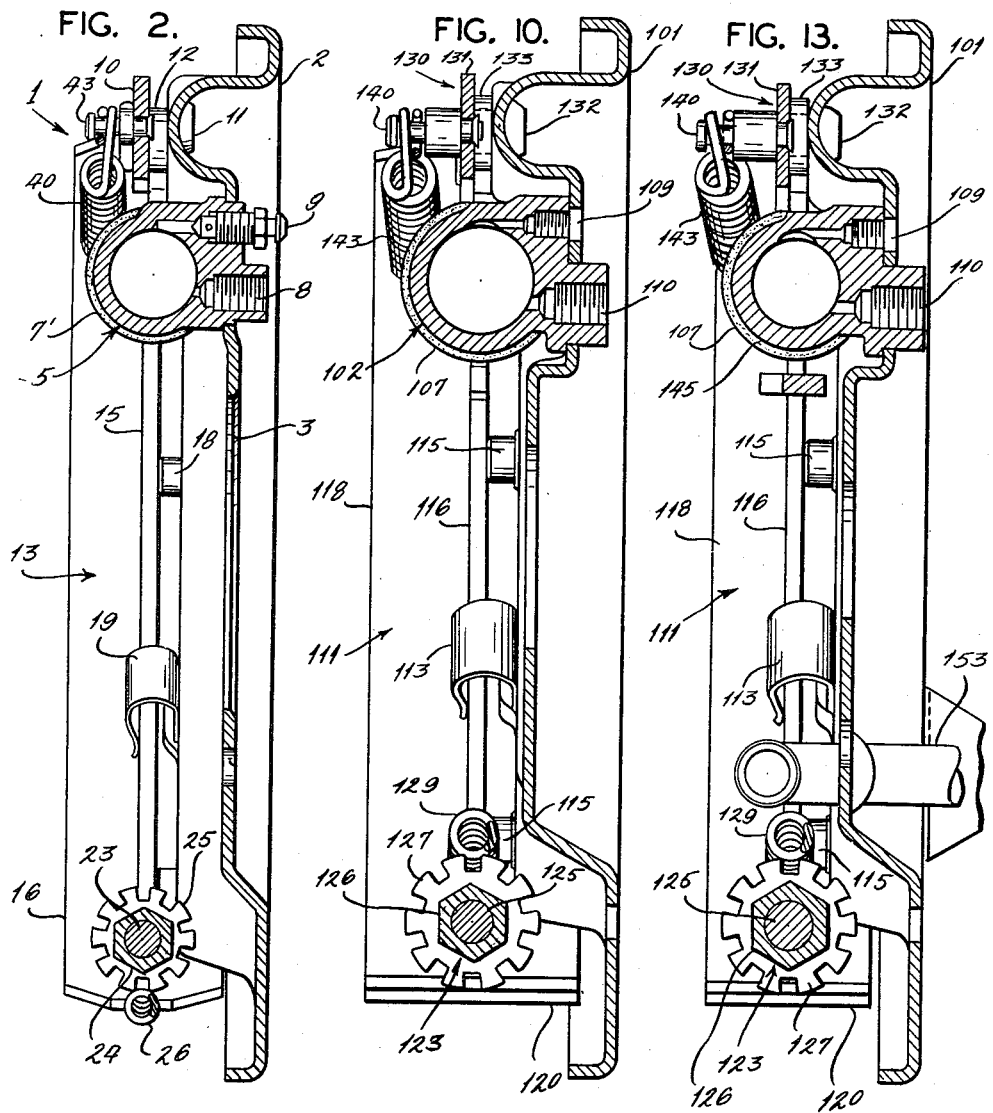

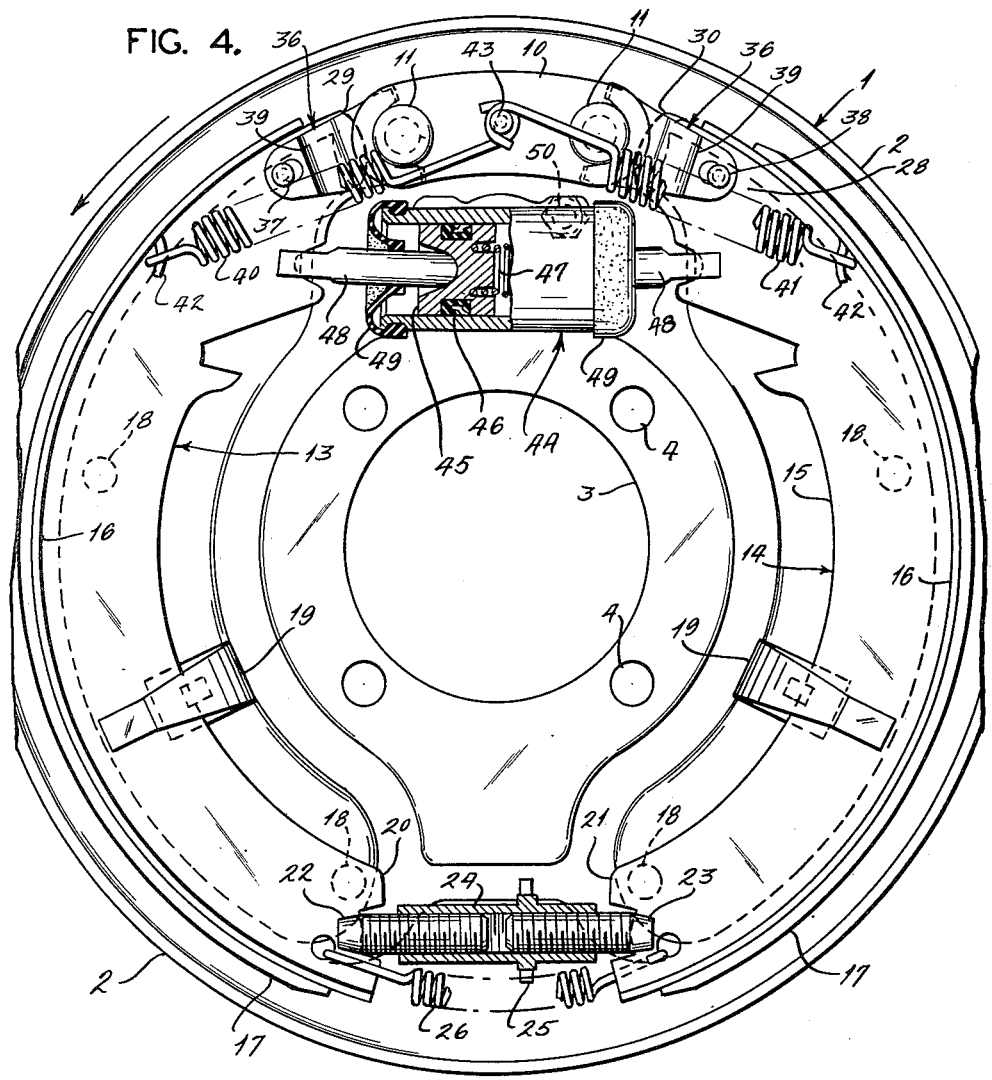

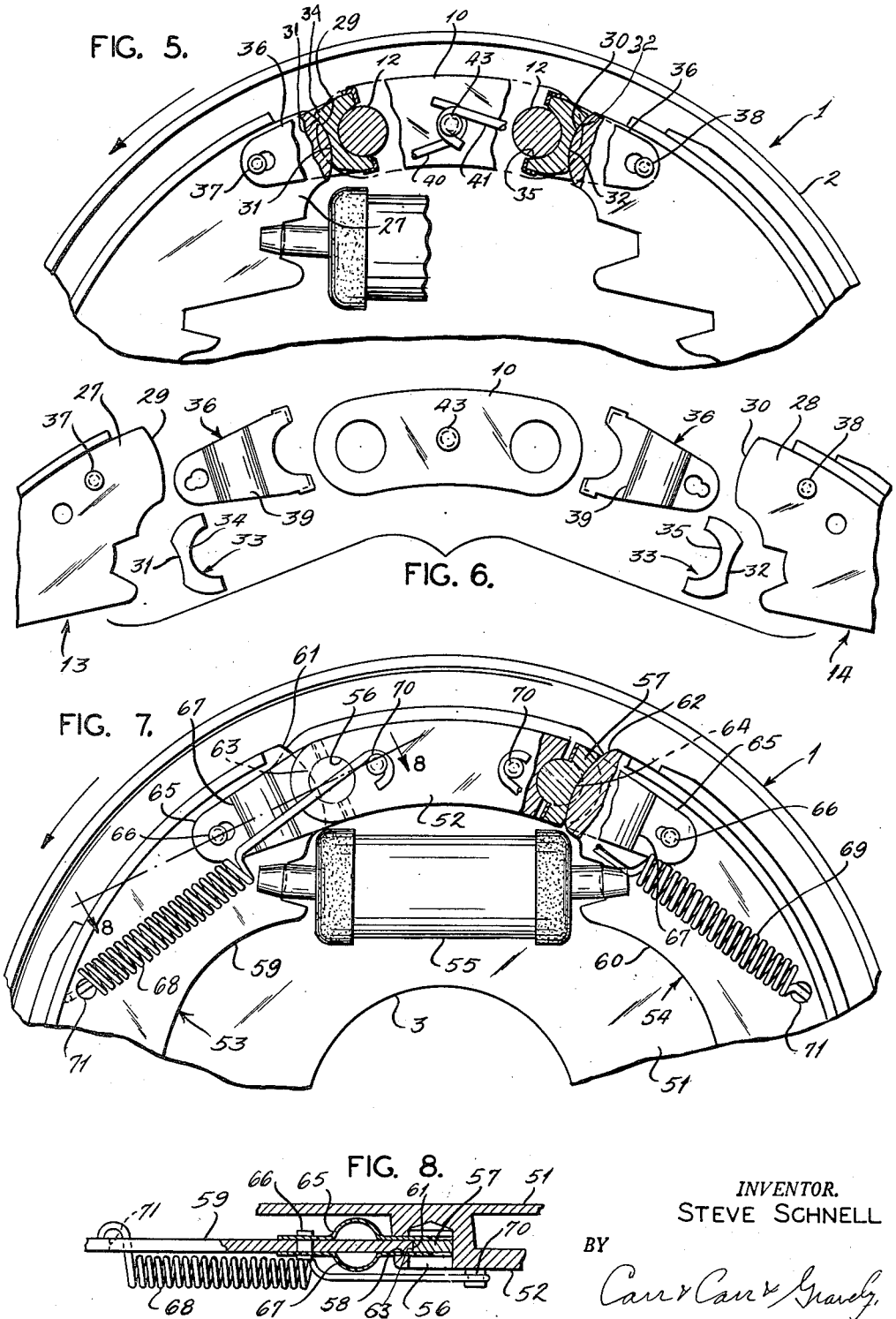

Dec. 21, 1954  S. SCHNELL  2,697,495
COMPOUND BRAKE MECHANISM FOR AUTOMOTIVE VEHICLES
Filed Sept. 29, 1950  6 Sheets-Sheet 5

INVENTOR.
STEVE SCHNELL
BY
Carr & Carr & Gravely,
ATTORNEYS.

Dec. 21, 1954  S. SCHNELL  2,697,495
COMPOUND BRAKE MECHANISM FOR AUTOMOTIVE VEHICLES
Filed Sept. 29, 1950  6 Sheets-Sheet 6

INVENTOR.
STEVE SCHNELL
BY
ATTORNEYS.

United States Patent Office 2,697,495
Patented Dec. 21, 1954

2,697,495

COMPOUND BRAKE MECHANISM FOR AUTOMOTIVE VEHICLES

Steve Schnell, Kirkwood, Mo., assignor to Wagner Electric Corporation, St. Louis, Mo., a corporation of Delaware Application September 29, 1950, Serial No. 187,407

7 Claims. (Cl. 188—78)

This invention relates to brake equipment and is more particularly directed to a compound self-centering brake mechanism for automotive vehicles.

The use of compound brakes has resulted in what is known as a "soft" pedal for brake mechanisms. Other types of brake, known as "hard" pedal brakes, require much more effort in their operation. During operation of soft pedal brakes, they frequently lock by reason of drum distortion or for other causes. When an operator accustomed to a hard pedal brake, drives a vehicle having a soft pedal brake, the tendency is to vigorously apply the brakes, which causes the wheels to skid, thus losing the effective braking effort.

The heavy application of the brakes distorts the brake drum associated therewith. Consequently, if a brake shoe is not properly centered with respect to the drum, excessive forces concentrated at one end of said shoe will cause the shoe to lock with said drum, causing the vehicle wheels to skid. Therefore, by incorporating the self-centering feature into a compound brake, the shoes are permitted to center themselves with respect to the brake drum, thus stabilizing the action of the brake mechanism. The instant invention seeks to improve the locking characteristics of a compound brake mechanism, eliminating the sensitiveness of a "soft" pedal.

In developing a compound brake mechanism with self-centering features, brake drag is occasionally encountered, which results in an increase in lining wear. Consequently, the present invention also seeks to eliminate the brake drag which, in some instances, is encountered in using a compound brake mechanism with the previously mentioned self-centering features. This is accomplished by the use of an intermediate member which assures the proper anchor location of a returning shoe.

The primary object of this invention is to provide brake mechanism operating with a soft pedal having improved non-locking characteristics.

Another object of the invention is to provide self-centering brake mechanism having improved anchor means for preventing the brake shoes assuming a new contact position with respect to the anchor means when the brake shoes are returned to inoperative position.

A further object of the invention is to provide a compound brake mechanism of the self-centering type requiring only one simple adjustment during assembly thereof.

A still further object of the invention is to provide a compound brake mechanism of the self-centering type requiring the use of a single adjusting means for compensating for lining wear that is less sensitive than the adjusting means on other types of compound brake mechanism.

This invention consists in the provision of a brake assembly having a backing plate to which anchoring means is secured and which cooperates with the unconnected ends of articulated brake shoes, there being a rotatable member disposed between the ends of the shoes and the anchor pins, the rotatable member being held in contact with the anchoring means by return springs, the shoes self-centering during the application thereof by rotating relative to the rotating means.

The invention also consists in the provision of a brake comprising a backing plate on which two or more articulated brake shoes are mounted and which cooperate with rotatable anchor pins mounted in an anchor bracket secured to the backing plate, the rotatable anchor pins being slotted to provide flat surfaces therein which are radial to the backing plate, the ends of the shoe webs being drawn against the flat radial surface by the return springs, thus maintaining the shoe webs in engagement with the flat surfaces.

Figure 11:
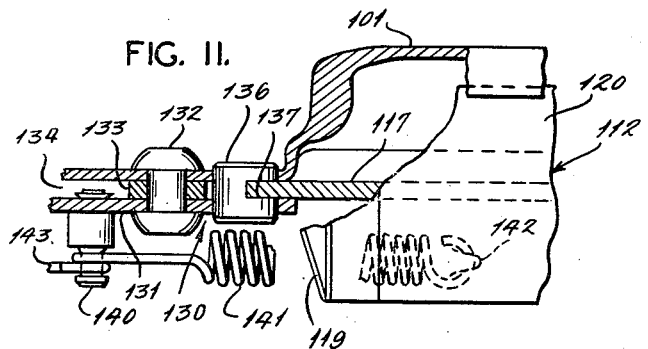
Figure 12:
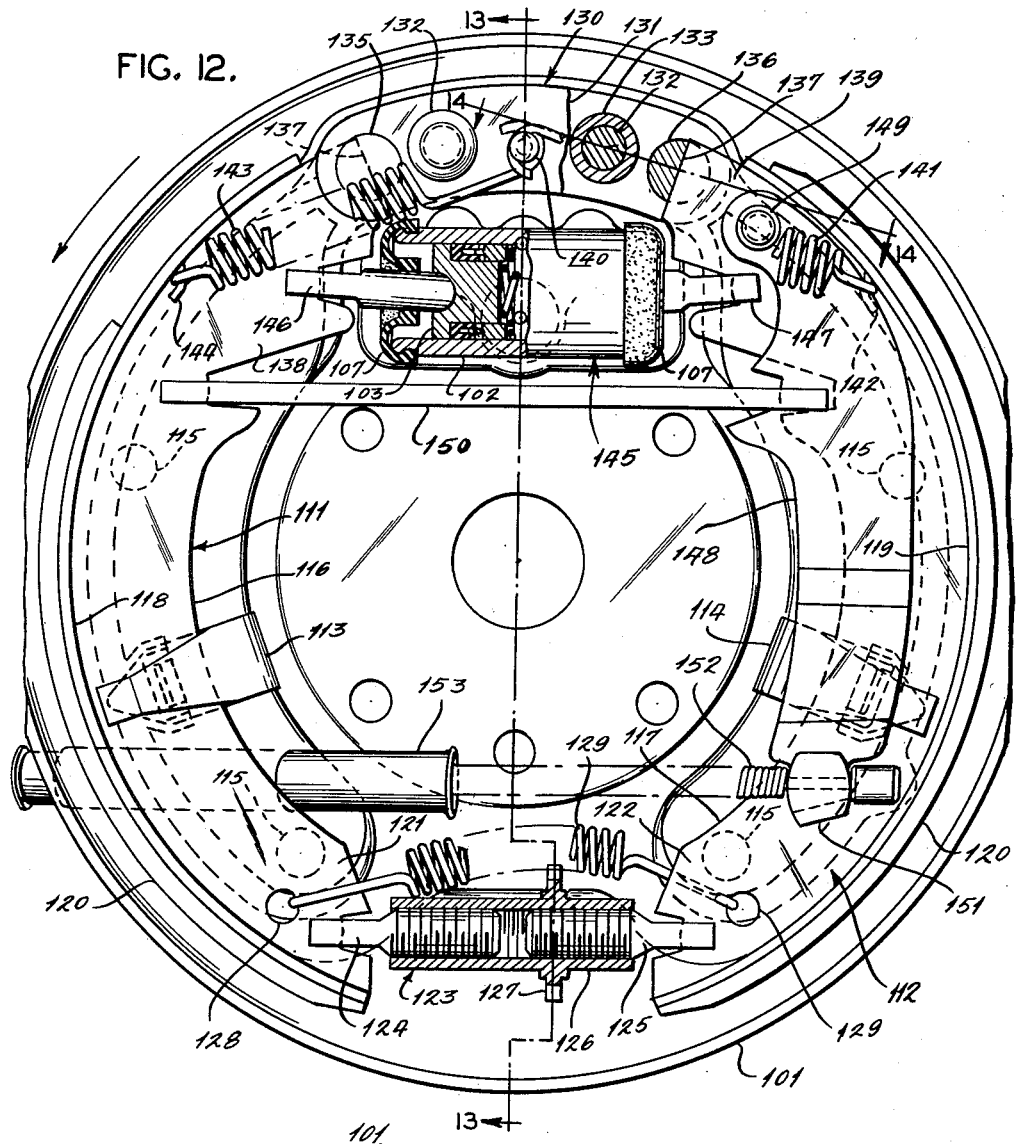
Figure 14:
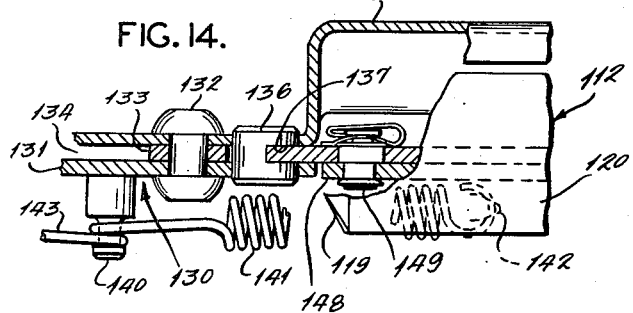

In the drawings:

Fig. 1 is a plan view of a compound forward brake mechanism embodying the invention, Fig. 2 is a sectional view taken along the line 2—2 of Fig. 1, Fig. 3 is a sectional view taken along the line 3—3 of Fig. 1, Fig. 4 is a plan view of a compound forward and reverse brake mechanism incorporating the invention, Fig. 5 is a view of the anchor means, partly in section, shown in Figs. 1 and 4, Fig. 6 is an exploded view of parts of Fig. 5, Fig. 7 is a view similar to Fig. 5 showing a modified anchoring mechanism, Fig. 8 is a sectional view taken along the line 8—8 of Fig. 7, Fig. 9 is a plan view of a modified compound forward brake mechanism, Fig. 10 is a sectional view taken along the line 10—10 of Fig. 9, Fig. 11 is a sectional view taken along the line 11—11 of Fig. 9, Fig. 12 is a plan view of a modified compound forward and reverse brake mechanism, Fig. 13 is a sectional view taken along the line 13—13 of Fig. 12; and Fig. 14 is a sectional view taken along the line 14—14 of Fig. 12.

In the embodiment of the compound forward brake illustrated in Figs. 1, 2 and 3 of the drawings, the numeral 1 designates the brake assembly comprising a backing plate 2 having an aperture 3 through which the rear axle or similar front wheel structure (not shown) extends, there being smaller apertures 4 provided for securing the backing plate to the axle housing or similar structure. The wheel cylinder 5 is secured to the backing plate by screws 6 and is equipped with a known piston and packing cup (not shown). The wheel cylinder is provided with a push rod 7 for engagement with a brake shoe. It is also provided with a bore 8 to which a conduit (not shown) is connected and through which pressure fluid derived from a suitable source is conducted to the cylinder 5. A bleeder valve 9 is threaded into the wheel cylinder for the purpose of releasing trapped air and fluid therefrom. A boot 7' is disposed over the open end of the cylinder for preventing ingress of foreign matter into the cylinder.

Anchoring means are provided for the brake shoes which consists of a plate 10 secured to the backing plate by anchor pins 11. Each of the anchor pins is provided with an enlarged or collar portion 12 so that plate 10 is spaced from the backing plate.

Brake shoes 13 and 14 are mounted on the backing plate. Each of these shoes consists of a web 15 and a table 16 to which a friction lining 17 is secured. The shoes are supported on the backing plate on abutment pins 18, and clips 19 hold the webs in engagement therewith so that the shoes will be maintained in alignment with respect to the cooperating brake drum. The heel 20 of shoe 13 and toe 21 of shoe 14 have an adjustment member disposed therebetween which consists of left and right screws 22 and 23 threaded into a sleeve nut 24. A star wheel 25 is formed on the sleeve nut 24 for adjusting screws 22 and 23. A spring 26 is connected between heel 20 and toe 21 for holding them in engagement with the screws. The spring engages star wheel 25 acting as a detent and normally preventing rotation thereof so that when the shoes are adjusted, they will be retained in that particular position of adjustment.

The toe 27 of shoe 13 and the heel 28 of shoe 14 are provided with curved ends 29 and 30. These curved ends engage complemental curved ends 31 and 32 (Figs. 5 and 6) of anchor blocks 33. The anchor blocks are provided with curved surfaces 34 and 35 which engage the collar portion 12 of the anchor pins. The anchor blocks are held in engagement with surfaces 29 and 30 by means of U-shaped springs 36 (Fig. 3). The closed ends of these springs engage the ends of the anchor block so that surfaces 34 and 35 (Fig. 5) may engage the anchor pins. The free ends of the U member are secured to the webs of the shoes by means of pins 37 and 38. The legs of the springs are bowed, as at 39 (Fig. 3) so that the anchor block will be drawn into engagement with the corresponding curved ends of the shoe webs. The anchor blocks 33 are held in engagement with anchor pins 11 by return springs 40 and 41 (Fig. 1). These springs are secured to suitable hooks 42 on the shoes and to a pin 43 secured to plate 10.

In operation of the mechanism it is assumed that the forward direction of rotation is as indicated by the arrow shown in Fig. 1. Fluid pressure derived from a suitable source is introduced into the wheel cylinder 5, thus causing the push rod 7, which is in engagement with toe 27 of shoe 13, to move the latter into engagement with the brake drum. Since drum rotation is in the same direction as the movement of toe 27, the shoe 13 will be self-energized. By reason of the friction between lining 17 and the brake drum, the braking force of shoe 13 is increased and transmitted by means of adjusting mechanism 22, 23 and 24 to toe 21 of shoe 14, thereby producing braking effort on this shoe. When forced into engagement with the brake drum, the shoe 14 creates an additional braking force, whereupon the summation of the forces of both shoes is absorbed by the anchor pin 11 in engagement with the heel 28 of shoe 14.

Additional advantages of this type of compound brake are apparent because of the action of shoe 14. In prior types of compound brakes employing the use of an anchor and shoe arrangement, the centering function was not present. When drum distortion occurred during a heavy brake application, the shoe 14 would not center but locked the wheel of the vehicle. This condition was apparently caused by excessive forces existing between the drum and the toe 21 of shoe 14; or by excessive forces between the heel 28 of shoe 14 and the drum, depending upon the type of distortion therein since locking results from unequalized forces acting on the anchored shoe. However, in the instant invention, the heel 28 of shoe 14 is provided with a curved surface 30 which cooperates with the curved surface 32 of anchor block 33 (Fig. 6) instead of merely having a pivot point relationship with the cooperating anchor pin, as in prior types of compound brake mechanism. Thus, during the above mentioned drum distortion, relative movement is permitted between the curved surfaces on shoe 14 and the cooperating anchor block, the magnitude of the movement being dependent upon the unequalized forces between shoe 14 and the brake drum. However, it will be noted that the relative movement between shoe 14 and the anchor block 33 does not take place when the toe 21 of shoe 14 is initially forced into contact with the brake drum if the shoe is already centered with respect to the drum because the shoe 14 and anchor block 33 pivot as a unit about anchor pin 11 by reason of the friction between said shoe and block in the early stages of brake application. With the excessive brake drum distortion above described, and assuming that the excessive forces are being created between toe 21 of shoe 14 and the brake drum, the toe 21 will not lock with the brake drum because the unequalized forces cause relative movement between the anchor block 33 and heel 28 of shoe 14. This relative movement causes shoe 14 to move in a circular motion and does not move along a line radial to the backing plate. In other words, the anchor block 33 is rotated in a counter-clockwise direction by the shoe as the heel 28 moves upwardly for increasing the forces existing between said heel and drum; and the toe 21 will also move upwardly and slightly to the right in order to maintain contact between the lining 17 and the drum. This movement distributes the forces over the entire area of the lining 17 in engagement with the drum, thereby eliminating the aforementioned excessive forces which normally concentrate on toe 21 of shoe 14, thus preventing the locking of the brake assembly by stabilizing the brake shoe action under the described conditions.

A spring 36 is secured to shoe 14 at the radius of curvature of the curved surfaces 30 and 32 for preventing any change in the tension of spring 36 when the curved surface 30 of shoe 14 moves relative to the corresponding surface 32 on the anchor block 33.

One of the advantages of this novel anchoring means is that the exact location of the pins in the above described brake is less critical than in other types of compound brakes.

Another advantage is that the shoes can be adjusted for lining wear by rotation of the sleeve nut 24, such adjustment being less sensitive than in other types of compound brake mechanism.

After a brake application has been completed, the brake shoes are returned to their released or inoperative position upon release of the pressure fluid from the wheel cylinder. The shoe 13 and its attached anchor block 33 are returned to engagement with the cooperating anchor pin 11 by means of return spring 40 and, by reason of the anchor arrangement, shoe 13 assumes the same position with respect to its cooperating anchor pin 11 that prevailed prior to the braking action.

In the above described brake assembly it is possible to substitute another fluid motor in place of the adjusting mechanism 22, 23 and 24 for energizing the shoe 14. However, the force applied to toe 21 of shoe 14 would not be as great in this case as in the construction described above wherein the force of shoe 13, which is a multiple of the force applied to toe 27 of shoe 13 by the wheel cylinder 5, is transmitted directly to the toe 21 of shoe 14. The compounding action of this brake mechanism is now apparent since shoe 13 is responsible for the energizing of shoe 14 wherein a greater braking force can be obtained with a given foot pedal pressure from that obtained in an ordinary brake mechanism. In other words, a greater braking effort can be obtained with the use of the above described compound brake mechanism and with less pedal effort, thus resulting in a soft pedal brake operation.

Fig. 4 shows a brake assembly similar to that illustrated in Figs. 1 and 2, the various parts thereof having the same reference numerals. A double acting fluid motor 44 replaces the single acting fluid motor of the Fig. 1 disclosure. This fluid motor is provided with two pistons 45, only one of which is shown. Each piston is provided with a packing ring 46 and a spring 47 is disposed between each of the pistons in the manner illustrated. Push rods 48 are connected between each of the pistons and each of the shoes 13 and 14, boots 49 being provided for enclosing the open ends of the fluid motor in a manner well known to the art. The fluid motor is secured to the backing plate by means of screws 50.

The operation of this brake assembly is identical to that described above. The brake is capable of operating in both forward and reverse directions, the operation being the same in both directions of rotation.

A modified form of the invention is illustrated in Figs. 7 and 8 employable on the compound forward and reverse brakes and in which 51 is the backing plate on which an anchor 52 is integrally secured. Brake shoes 53 and 54 are mounted on the backing plate in a manner similar to that shown in Fig. 1. The brake shoes are actuated into engagement with the brake drum by a double acting fluid motor 55, similar in construction to that illustrated in Fig. 4. The anchor 52 is provided with a bore 56 cut in each end thereof in which an anchor block 57 is received as well as in slots 58. The ends of the anchor are slotted as at 58 (Fig. 8) in which slot webs 59 and 60 of shoes 53 and 54 are received. The ends of the shoes are cut to a radius for forming curved surfaces 61 and 62. These curved surfaces engage curved surfaces 63 and 64 cut in anchor blocks 57. The curved surfaces in anchor blocks 57 are complemental to the curved ends of the shoes in order that they may move easily with respect to the anchor 52. The anchor blocks 57 are disposed between the anchor 52 and the ends of the shoe, one end of said block being formed to a radius complemental to the radius of bore 56. A U-shaped spring 65 is pivotally connected to the webs of shoes 53 and 54 by means of pins 66. The closed end of the U snugly fits about the anchor block 57 for holding it in engagement with the curved end of each of the shoes. The legs of the U member are bowed as at 67 (Fig. 8) for tensioning anchor block 57 and the web of each of the shoes. Return springs 68 and 69 are connected between pins 70 secured in anchor 52 and apertures 71 cut in the web of each of the shoes, the springs seating anchor blocks 57 in the anchor. The unanchored ends of the shoes (not shown) are connected in the same manner as that illustrated in Figs. 1 and 4.

During forward drum rotation of the Fig. 7 disclosure, the forward shoe 53 is forced into contact with the brake drum by the fluid motor 55, the force developed in the forward shoe 53 being applied to the toe of the rearward shoe 54 to force the latter into engagement with the brake drum. Thus, as the shoe 53 is moved outwardly, the associated anchor block 57 moves with said shoe as a unit, the semi-circular portion thereof being pulled away from the circular surface in the anchor. Any self-centering that might be required of the rearward or reverse shoe 54 during operation occurs, as previously described, with a relative movement taking place between the anchor block 57 and the heel of the reverse shoe. During reverse rotation of the drum, the operation is the same except that the heel end of the shoe 54 will be moved into contact with the brake drum, thus breaking the contact between the anchor 57 and anchor 52. The shoe 53 anchors during reverse rotation and, therefore, in the modified anchor means of Fig. 7, the pin construction shown in Fig. 1 is eliminated without any change occurring in the operation thereof.

A further modification of the invention is illustrated in Figs. 9, 10 and 11 in which numeral 101 designates the backing plate of the brake assembly. A wheel cylinder 102 is secured to the backing plate by suitable securing means (not shown). The wheel cylinder has a piston 103 therein provided with a packing ring 104 and a packing ring expander 105 mounted on the piston. A spring 106 is disposed between the closed end of the wheel cylinder and the packing ring expander 105 and piston 103 for moving the piston outwardly. A boot 107 is fitted over the open end of the wheel cylinder and a push rod 108 engages piston 103 and extends through an opening in boot 107. The wheel cylinder is provided with threaded bores 109 and 110, one of which receives a bleeder valve (not shown), the other receiving a conduit leading to a source of pressure fluid supply, such as a master cylinder.

Brake shoes 111 and 112 are mounted on the backing plate for movement relative thereto. The shoes are held on the backing plate by clips 113 and 114 and are also supported on abutment pins 115. These pins are engaged by webs 116 and 117. Tables 118 and 119 are secured to the web of each shoe, and a friction lining 120 is secured to each of the tables for engagement with a brake drum (not shown).

The heel 121 of shoe 111 is connected to the toe 122 of shoe 112. The connection comprises an adjusting member 123 made up of left and right hand screws 124 and 125, which screws are threaded into a sleeve nut 126. A star wheel 127 is secured to sleeve nut 126. The heel of shoe 111 and the toe of shoe 112 have apertures 128 cut therein in which the ends of a spring 129 are secured, the spring resting between the teeth of the star wheel. Rotation of the sleeve nut and star wheel will adjust the brake shoes 111 and 112 with respect to the backing plate, spring 129 serving as a detent following each adjustment. The ends of screws 124 and 125 are suitably interlaced with the webs of each of the shoes.

The opposite ends of these shoes are engageable with an anchoring means 130, which means consists of a strap 131 secured to the backing plate 101 by rivets 132. A spacer 133 (Fig. 11) is placed between the strap and the backing plate to provide a space 134, the spacer being disposed about each of the rivets 132. Anchor pins 135 and 136 are rotatably mounted in the strap 131 and in backing plate 101, each being suitably bored to receive the anchor pins. Each anchor pin has a slot 137 milled therein, the base of which is substantially radial to the backing plate. The toe 138 of shoe 111 has a flat surface thereon and the portion of the shoe web on which the flat surface is cut, is disposed in the space 134 to be received in slot 137. The heel 139 of shoe 112 has a flat surface on the end of the web which extends into the space 134 and is received in slot 137 of pin 136. The strap 131 has a pin 140 fixed therein about which one end of a return spring 141 is hooked, the other end of the spring being secured to a hook 142 struck from table 119 of shoe 112. The spring 141 maintains the flat end on heel 139 in contact with the radial base of slot 137 in pin 136. A return spring 143 has one end hooked about pin 140 and the other end secured to hook 144 struck from table 118 of shoe 111. The spring 143 maintains the flat end of toe 138 in engagement with the radial base of slot 137 cut in pin 135. The push rod 108 is suitably slotted to be received in a slot in shoe 111 so that when pressure fluid is forced into the wheel cylinder, the piston 103 will move the shoe 111 into engagement with the brake drum. The various flat surfaces described above may be made curved in some types of brake construction.

Assuming that the forward direction of rotation of the brake drum is in the direction of the arrow, the movement of piston 103 in the wheel cylinder will move toe 138 toward the brake drum. Since the drum rotation is in the same direction of movement of toe 138, a self-energizing effect will be created in shoe 111. The braking force created in shoe 111 by reason of the friction between the lining 120 and the brake drum, is transmitted through the adjusting member 123 to toe 122 of shoe 112. As soon as the toe of shoe 112 is forced into contact with the drum, an additional braking force is created, whereupon the summation of the forces created in shoes 111 and 112 are absorbed by the anchor pin 136.

At this point the advantages of the instant type of compound brake can be set forth. Where drum distortion occurs during a heavy brake application, the anchored shoe 112 would not be allowed to center if ordinary types of anchors were employed. The locking of a brake assembly in a distorted drum, apparently results from the excessive forces between the drum and toe 122 of shoe 112, or because of excessive forces between the heel 139 and the drum. This locking would be the result of unequalized forces acting on the anchored shoe. However, in the present invention the heel 139 of shoe 112 is provided with a flat surface engaging the base of slot 137 cut in pin 136, which makes possible a relative movement of heel 139 with respect to pin 136. Thus, during drum distortion relative movement is permitted between the flat surface and the base of the slot in pin 136, the magnitude of the movement being dependent upon the unequalized forces acting between the shoe 112 and the brake drum. It will be noted that this relative movement does not take place when the toe 122 of shoe 112 is initially forced into contact with the brake drum if the shoe is properly centered with respect thereto, because shoe 112 and pin 136 pivot as a unit in the early stages of brake application. However, in the case of excessive drum distortion and, assuming that excessive forces are being created between the toe 122 and the brake drum, said toe will not lock with the brake drum since the unequalized forces will cause the relative movement between pin 136 and heel 139 to take place, thus centering the brake shoe 112. This relative motion is slightly circular and substantially radial to the backing plate and the brake drum. In other words, the anchor pin 136 is rotated in a counterclockwise direction by heel 139 of the shoe 112 which moves toward the drum, thereby increasing the force existing between said heel and drum. The toe 122 will move upwardly and slightly to the right in order to maintain contact between the lining 120 and the drum. This movement distributes the forces over the entire area of the lining 120 in engagement with the drum, thus eliminating the aforesaid excessive forces which were concentrating at toe 122, thereby preventing the locking of the brake assembly and stabilizing the brake shoe action.

The use of the above described anchoring means makes the location of the anchor pin less critical than in other types of compound brake mechanism. By reason of this construction a simple adjustment for lining wear can be made by rotating the sleeve nut 126 in the proper direction, such adjustment being less sensitive than similar adjustments on other types of compound brake mechanism. During brake operation, the flat surface on toe 138 of the shoe 111 is separated from the base of slot 137 in anchor pin 135.

It is possible to substitute a fluid motor in place of the adjusting member 123. However, if this were done, the total force applied to shoe 112 would not be as great as when the shoe is energized from the heel 121 of shoe 111. Conversely, the same braking effort can be obtained with the use of a compound brake mechanism with less pedal effort than that required with the use of a non-compound brake mechanism.

A further modification of the invention is disclosed in Figs. 12, 13 and 14 which is similar to that described in connection with Figs. 9 through 11, corresponding parts bearing the same reference numerals. The single acting wheel cylinder of Fig. 9 is replaced by a double acting wheel cylinder 145. This wheel cylinder has two pistons and is provided with two push rods 146 and 147 which also suitably engage the toe and heel of shoes 111 and 112 respectively.

The operation of this brake assembly is identical to that described above with the exception that it is effective in both directions of rotation of the brake drum. During each brake operation the actuated shoe separates from the cooperating anchor pin, as above described. Means are provided for manually setting the brake which comprises a lever 148 pivoted to the heel of shoe 112 by means of a pin 149 suitably held therein. A bar 150 is connected between lever 148 and shoe 111 so that both shoes will be actuated into engagement with the brake drum upon movement of lever 148. This lever is provided with a fitting 151 which receives a cable 152 leading through a tube 153 set in the backing plate 101. This cable is connected to a hand lever at the operator's station and is manually actuated, as is customary in the art.

What I claim is:

1. In a brake mechanism for use with a brake drum having a backing plate, anchoring means, fluid motor, brake shoe adjusting means, brake shoe return springs; a pair of brake shoe assemblies comprising a brake shoe, a movable anchor block engaging said brake shoe and arranged to be removably engageable with said anchoring means, and a U-shaped resilient member pivotally carried by only said brake shoe for holding said anchor block in frictional engagement with said brake shoe.

2. In a brake mechanism having a backing plate, anchoring means carried by said backing plate, a fluid motor adjacent said anchoring means, brake shoe adjusting means located diametrically opposite said anchoring means, brake shoe return means associated with said anchoring means; a plurality of brake shoe assemblies cooperable with a brake drum and carried by said backing plate comprising a brake shoe, a movable anchor block engaging said brake shoe and arranged to be removably engageable with said anchoring means, and a U-shaped resilient member independent of said anchoring means and pivotally mounted on said brake shoe for holding said anchor block in frictional engagement with said brake shoe.

3. In a brake mechanism for use with a brake drum comprising a backing plate, a plurality of brake shoe assemblies mounted on said backing plate in an end-to-end relation with each of said brake shoe assemblies having a free end, adjustable means arranged between adjacent ends of said brake shoe assemblies for adjusting same with respect to said drum, a fluid motor for actuating one of said brake shoe assemblies into engagement with said brake drum, anchoring means supported by said backing plate and disposed between the free ends of said brake shoe assemblies, means for normally holding said free ends of said brake shoe assemblies in engagement with said anchoring means, said brake shoe assemblies including a brake shoe, a movable anchor block engaging said brake shoe and arranged to be removably engageable with said anchoring means, and a U-shaped resilient member pivotally carried by only said shoe for holding said anchor block in frictional engagement with said shoe.

4. In a brake mechanism for use with a brake drum comprising a backing plate, a pair of brake shoe assemblies mounted on said backing plate in an end-to-end relation with each of said brake shoe assemblies having a free end, adjustable means arranged between adjacent ends of said brake shoe assemblies for adjusting same with respect to said brake drum, a fluid motor for actuating one of said brake shoe assemblies into engagement with said brake drum, anchoring means supported by said backing plate and disposed between the free ends of said brake shoe assemblies, resilient means for normally holding said free ends of said brake shoe assemblies in engagement with said anchoring means, said brake shoe assemblies including a brake shoe, a movable anchor block engaging said brake shoe and arranged to be removably engageable with said anchoring means, and a U-shaped resilient member independent of said anchoring means and pivotally mounted at one end to said shoe for holding said anchor block in frictional engagement with said shoe, said U-shaped resilient member being provided with a recess at its unconnected end to permit said anchor block to engage said anchoring means.

5. In a brake mechanism for use with a brake drum including a backing plate, anchoring means carried by said backing plate, a fluid motor for controlling said brake mechanism, adjusting means diametrically opposite said anchoring means, brake shoe return means associated with said anchoring means, and a plurality of brake shoe assemblies comprising a brake shoe having an arcuate surface at one end thereof, an anchor block engaged by said brake shoe and removably engageable with said anchoring means, said anchor block having an arcuate surface cooperable with the arcuate surface on said brake shoe, said anchor block having a second arcuate surface opposite said first mentioned arcuate surface engageable with a cooperating surface on said anchoring means, and a U-shaped resilient member independently of said anchoring means and pivotally mounted at one end of said brake shoe for holding said anchor block in frictional engagement with said brake shoe, said U-shaped resilient member being provided with a recess at its free end to permit said anchor block to engage said anchoring means.

6. In a brake mechanism for use with a brake drum including a backing plate, a pair of brake shoe assemblies mounted on said backing plate in an end-to-end relation with each of said brake shoe assemblies having a free end, adjustable means arranged between adjacent ends of said brake shoe assemblies for adjusting said brake shoe assemblies with respect to said brake drum, a fluid motor for actuating one of said brake shoe assemblies into engagement with said brake drum, anchoring means supported by said backing plate and disposed between the free ends of said brake shoe assemblies, said anchoring means having a curved recess in each end thereof, resilient means for normally holding said free ends of said brake shoe assemblies in engagement with said anchoring means, said brake shoe assemblies comprising a brake shoe, a movable anchor block engaged by said brake shoe having an arcuate convex surface removably received in one of said curved recesses in said anchoring means, and a U-shaped resilient member pivotally carried by only said brake shoe for holding said anchor block in frictional engagement with said brake shoe, said U-shaped member having a recess opposite its pivoted end for receiving a portion of said anchor block.

7. In a brake mechanism for use with a brake drum including a backing plate, a pair of brake shoe assemblies mounted on said backing plate in an end-to-end relation with each of said brake shoe assemblies having a free end, adjustable means arranged between adjacent ends of said brake shoe assemblies for adjusting same with respect to said brake drum, a fluid motor for actuating one of said brake shoe assemblies into engagement with said brake drum, anchoring means carried by said backing plate and disposed between the free ends of said brake shoe assemblies, said anchoring means including an anchor pin at each end thereof, resilient means for normally holding said free ends of said brake shoe assemblies in engagement with said anchoring means, said brake shoe assemblies comprising a brake shoe, a movable anchor block engaged by said brake shoe having an arcuate surface slidably arranged against the end of said brake shoe, a second arcuate surface on said anchor block removably engageable with one of said anchor pins, and a U-shaped resilient member independently of said anchoring means and pivotally mounted at one end to said brake shoe for holding said anchor block in frictional engagement with said brake shoe, said U-shaped member having a recess opposite its pivoted end to permit said anchor block to engage said one of said anchor pins.

References Cited in the file of this patent

UNITED STATES PATENTS

| Number | Name | Date |
| --- | --- | --- |
| 1,873,389 | Gunn | Aug. 23, 1932 |
| 2,218,201 | Lapwood | Oct. 15, 1940 |
| 2,325,998 | Schnell | Aug. 3, 1943 |
| 2,331,349 | Schnell | Oct. 12, 1943 |
| 2,380,814 | Whitacre | July 31, 1945 |
| 2,398,717 | Owens | Apr. 16, 1946 |

FOREIGN PATENTS

| Number | Country | Date |
| --- | --- | --- |
| 487,316 | Great Britain | June 17, 1938 |
| 563,969 | Great Britain | Sept. 7, 1944 |